Patented Jan. 5, 1932

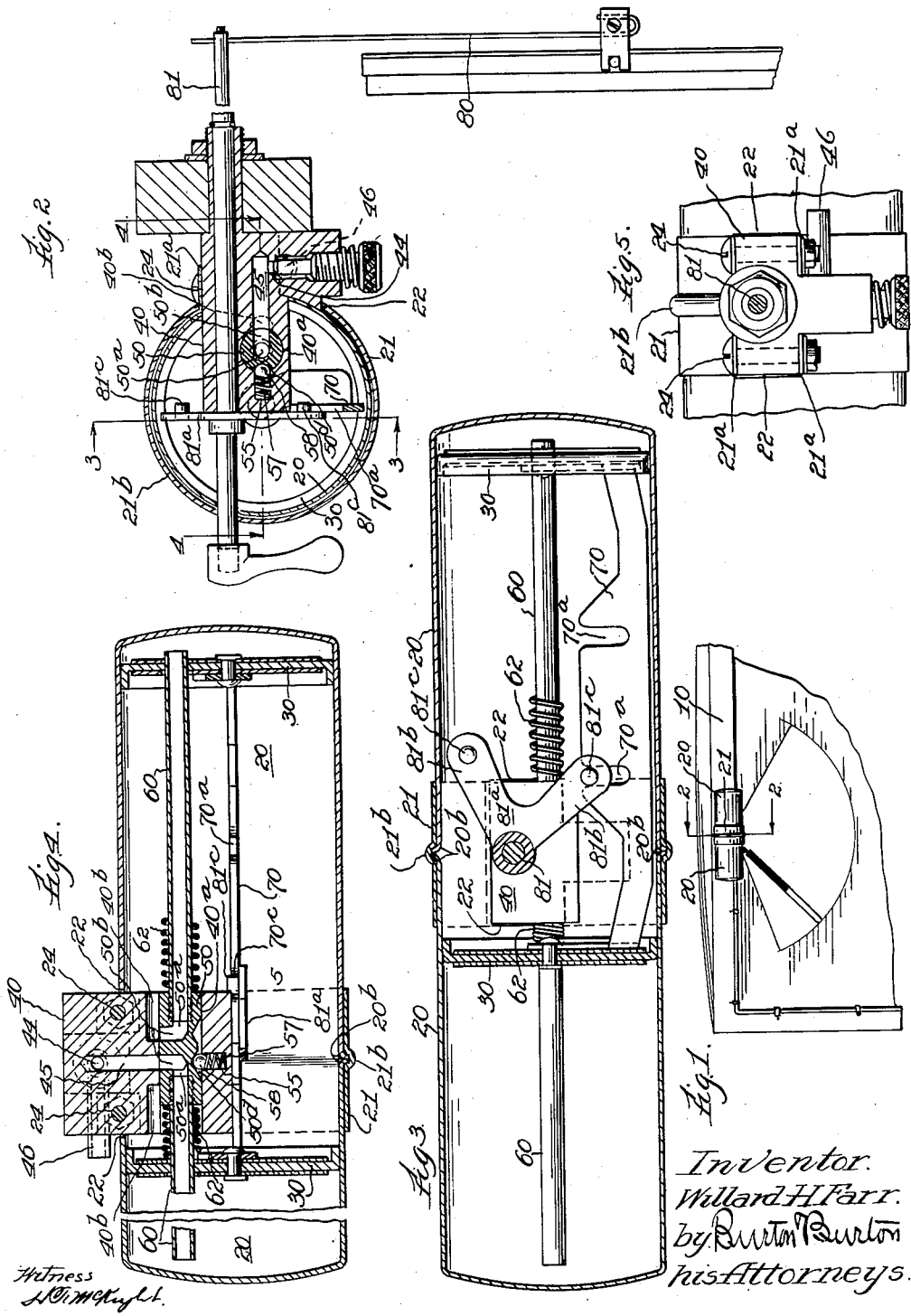

1,839,540

UNITED STATES PATENT OFFICE

WILLARD H. FARR, OF CHICAGO, ILLINOIS, ASSIGNOR TO STEWART-WARNER CORPORATION, OF CHICAGO, ILLINOIS, A CORPORATION OF VIRGINIA

MOTOR

Application filed December 10, 1927. Serial No. 239,103.

The purpose of this invention is to provide an improved construction of a windshield wiper and the like adapted to be mounted on the windshield and to be operated by the suction from any convenient source. It consists in the elements and features of construction shown described as indicated in the claims.

In the drawings:—

Figure 1 is a rear side elevation of a device embodying this invention shown mounted upon the rear or inner side of the windshield to be served.

Figure 2 is a section at the line 2—2 on Figure 1.

Figure 3 is a section at the line 3—3 on Figure 2.

Figure 4 is a section at the line 4—4 on Figure 2.

Figure 5 is a detail elevation of the middle part of the structure showing the wiper-operating shaft in section.

In the structure shown in the drawings the upper frame bar of the windshield is indicated at 10. The wiper-operating structure comprises two cylinders, 20, 20, each open at one end and closed at the other end, said cylinders being mounted in axial alignment with their open ends proximate and secured together by a clasp, 21, as hereinafter more particularly described. Mounted for reciprocation in each cylinder there is a piston, 30. At their proximate ends the cylinders have registering notches, 22, 22, which when the cylinders are secured together as shown, form a rectangular aperture in which there is mounted a valve housing member, 40, which is intruded through the aperture, 22, 22, being dimensioned for accurately fitting the same, and the clasp, 21, which secures together the two cylinders, 20, has its ends turned outwardly, forming terminal lugs, 21ª, 21ª, which lap upon the exterior portion of the housing member, 40, and are secured thereto by bolts, 24, 24, extending through said lugs and said housing member, the clasp, 21, being dimensioned so that when the lugs are drawn snugly onto the housing member the clasp is strained tightly around the clasped ends of the cylinders, 20, and thereby the two cylinders and the housing member and the clasp are very rigidly held together. For increasing the security of the connection of the two cylinders together they are each flanged outwardly at their meeting open ends as seen at 20ᵇ, and the clasp, 21, has an outwardly struck inwardly concave bead, 21ᵇ, in which the flanges, 20ᵇ, are received and pressed together by the snug fit of the bead over said flanges.

The piston, 30—30, are connected together for concurrent movement by a connector, 70, which extends within the cylinder past the valve housing member. The valve housing member, 40, has an aperture extending through it constituting a seat for the sliding valve member, as seen at 40ª, and a slide valve member, 50, is provided seated slidingly in said valve seat of the housing. This valve member has passages, 50ª, 50ª, extending in from its opposite ends stopping short of its middle so that they are non-communicating, each of said passages having a port from its inner end opening through the seating surface of the valve member, as seen at 50ᵇ, 50ᵇ, said ports being in the same radial plane so that they open at the same side of the valve member. The valve housing member, 40, has a duct, 44, opening in the slideway or seat, 40ª, of the valve member, at a port, 45, located midway in the length of said slideway. In the same radial plane as said port, 45, extending in from the opposite ends of the housing to within a distance of the port, 45, substantially equal to the distance between the ports, 50ᵇ, 50ᵇ, of the valve, there are provided grooves, 40ᵇ, each of which cuts away the valve slide seat for the circumferential distance of the width of the groove. This width is at least the diameter of the ports, 50ᵇ, so that the ports, 50ᵇ, 50ᵇ, of the valve members when registered respectively with the inner end portions of said grooves at the opposite limits of the stroke of the valve members, are beyond the seat at the radial zone of the valve member in which said ports are situated. The effect is equivalent to reducing the length of the housing to a distance substantially equal to the sum of the diameters of the two ports, 50ᵇ, 50ᵇ, and the partition between them. The duct 44, leads in the housing member, 40, to a suction connection, 46, at a point outside the cylinder, and a valve, 56, is provided for controlling said connection.

For guiding the pistons, 30, 30, in the cylinders, 20, 20, respectively, there are provided tubular guides, 60, 60, which are screwed into the ends of the passages, 50ᵃ, 50ᵃ, respectively, of the valve member, 50. The pistons, 30, 30, are mounted slidingly on these tubular guides respectively, which extend through the pistons so as to expose their open ends in the closed-end portion of the cylinders respectively, thereby affording free gas communication from the cylinder cavity to the passages, 50ᵃ, 50ᵃ, respectively, and thence to the duct, 44, when the ports, 50ᵇ, 50ᵇ, are respectively registered with the port, 45, of said duct, 44, and affording also free atmospheric communication to the opposite cylinder cavities, respectively, by way of the port, 50ᵇ, which is beyond the slideway when the other port is registered with the port, 45, as described.

Springs, 62, 62, are provided coiled about the tubular stems, 60, 60, respectively, stopped at the inner end on the valve member, 50, and of sufficient length to be encountered by the pistons respectively at a predetermined limit of the strokes of the pistons inwardly, that is, away from its closed end toward the valve housing. In the valve housing at a point directly opposite the port, 50ᵇ, of the duct, 45, there is formed a recess, 55, in which there is lodged a coil spring, 57, and seated upon the spring a steel ball, 58; and the valve member, 50, has formed in it directly opposite each of the ports, 50ᵃ, a recess or indentation, 50ᵈ, adapted to seat the ball, 58, which, it will be understood, is thrust into the seat by the reaction of the spring, 55, when the reciprocation of the valve member brings the recess into registration with the ball.

The duct, 45, being connected with a source of suction, the operation of the construction thus far described may be understood as follows: The valve member being at position for registering one of its ports, 50ᵃ, with the duct, 54, suction is admitted through said duct and port, and the connected passage, 50ᵃ, and the passage through the tubular guide member, 60, to the closed end of the corresponding cylinder between said closed end and the piston of that cylinder, which results in that piston being thrust inwardly by atmospheric pressure which is at all times admitted freely to the proximate open ends of both cylinders; and the opposite piston being actuated by the connector, 70, is pulled inward against the spring, 62, compressing that spring until the stress communicated thereby to the valve member, 50, is sufficient to disengage the valve member from the ball, 58, which disengagement occurs instantly, resulting in a snap movement of the valve in the direction of the springs reaction, carrying the registered port out of registration with the port, 45, and the other port into registration therewith; at which position the movement is arrested by the engagement of the ball with the other recess. This movement, it will be seen, shifts the suction to the opposite cylinder, and vents suction from the cylinder which was first connected with the suction, the venting taking place through the tubular stem upon which that piston is guided, and the port, 50ᵃ, through which suction was admitted, that port being now carried out of the slideway and into the free atmospheric region at the junction of the open ends of the cylinders; and thereupon the pistons are actuated in the opposite direction; and thus the reciprocation will continue as long as the suction connection is maintained.

Advantage is taken of the piston connector which reciprocates with the pistons for operating a wiper arm, 80, which is carried on a rock shaft, 81, journalled in the valve housing member, 40, and protrudes therefrom at the forward side and extends through the frame bar of the windshield for receiving at its rear end,—at the inner side of the windshield,—said wiper arm, 80, which is of familiar construction requiring no specific description here. The rock shaft, 81, carries inside the cylinder, a rocker, 81ᵃ, which consists of two lever arms, 81ᵇ, 81ᵇ, each having a pin, 81ᶜ, projecting laterally near the end of the arm for engaging notches, 70ᵃ, 70ᵃ, in the piston connector, 70, whereby in a manner readily understood from the drawings, the reciprocation of the connector, 70, rocks the rocker, 81ᵃ, and the rock shaft, 81, alternatively in opposite directions for swinging the wiper arm through any desired angle less than 180 degrees for wiping the glass of the windshield.

I claim:—

1. In a device for the purpose indicated in combination with two cylinders disposed in axial alignment having their remote ends closed and open to atmosphere at their proximate ends; a valve mounting member interposed between the proximate ends; a piston in each cylinder and an end-to-end hollow piston guide member mounted in the valve housing comprising a medial valve portion fitted slidingly in said valve housing and cooperating as a valve therewith, said housing having a duct leading out laterally from the slide seat of the valve member and adapted to be connected from its outer end to a source of suction, the valve housing having a medial partition closing its axial bore and ports leading from said bore at opposite sides of the position for registration with the port of the suction duct at opposite limits of the stroke of the valve member in the housing; means for yieldingly holding the valve at positions for registering said ports respectively with the suction port; springs reacting between the pistons respectively and the guide member for yieldingly resisting movement of the pistons respectively toward the valve housing, and means connecting the pistons for causing it to actuate the other.

2. In combination with a member having two axially aligned piston chambers closed at their remote ends and having atmospheric communication at their proximate ends; a valve housing member fixed with respect to the piston chambers positioned medially between them and having a valve slideway extending through it; a valve member fitted slidingly in said slideway and having passages leading in from its opposite ends, and lateral ports from said passages to the slideway-fitted surface of said valve member, said valve housing having a suction port positioned for registration with the valve ports at opposite limits respectively of a limited slide movement of the valve in the slideway; tubular stems extending from opposite ends of the slide valve member communicating respectively with the axial ducts in the opposite end portions of said slide valve member, pistons in the piston chambers sliding on the tubular stems respectively, springs reacting between the pistons respectively and the valve member, and means yieldingly engaging the valve member with the housing at the positions respectively of the valve member at which its lateral ports register with the suction port, said engaging means adapted to yield and permit the valve to move in the slideway upon predetermined stress of the spring on the valve member due to movement of the piston toward the valve housing, and means positively connecting the pistons to cause the movement of either away from the housing to carry the other toward the housing.

3. In a device for the purpose indicated, in combination with a cylinder and piston therein, a member mounted within the cylinder extending through the piston and having ducts with ports located at opposite sides of the range of reciprocation of the piston; a support for said member in which the latter is mounted slidingly beyond the range of the piston stroke in one direction, said support having a duct leading for communication with a source of suction and leading also to the slide bearing of said first mentioned member, the said member having one of its two ports opening laterally at said slide bearing, and resilient means by which the movement of the piston in one direction on the said member yieldingly actuates the latter for sliding the journaled part thereof in its slide bearing in the support for registration of said port with the duct in said support, and resilient means reacting in the opposite stroke of the piston to move said member out of position for registration of said duct and port.

4. In a device for the purpose indicated, a pair of cylinders each closed at one end and open to atmospheric pressure at the other end, said cylinders being rigidly joined in axial alignment with their last mentioned ends proximate; a valve housing member mounted fixedly with respect to said cylinders at their said proximate ends having a valve slideway extending through it parallel with the cylinder axis; a valve device mounted in said slideway, said valve device having ducts leading in from its opposite ends respectively with lateral ports leading from the inner ends of said ducts opening at the seating surface of the valve device in the slideway, said valve housing having a duct opening at one end in said slideway and at the other end adapted for connection with a source of suction; pistons in said cylinders respectively; tubular members mounted in the opposite ends of said valve device at said ducts therein respectively, and affording extension of said ducts, said tubular members being extended through the pistons respectively and opening for discharge in the respective cylinders beyond the outward stroke of the pistons therein; springs coiled on said tubular members respectively reacting between the pistons and the valve device to which said tubular members are attached; whereby the movement of each piston away from the closed end of its cylinder tends yieldingly to move the valve device in the slideway in the same direction; means in the slideway cooperating with the valve device and slideway for yieldingly locking the valve device at the positions of registration of its ports respectively with the ducts of the housing member, said locking device being adapted to yield and permit movement of the valve upon predetermined stress due to the movement toward the valve housing of the piston at the end of said valve housing opposite that having the registered port.

5. In a construction for the purpose indicated, in combination with two piston cylinders arranged end to end and closed at their remote ends, a piston mounted for reciprocation therein, an element supported within and extending longitudinally of the cylinders and having ducts open at opposite ends of said element in and proximate to the closed ends of the cylinders respectively, said element member having duct connection intermediate its ends with a source of fluid pressure for operating the pistons.

6. In a construction for the purpose indicated, in combination with two cylinders arranged end to end closed at their remote ends, means interposed between the two cylinders for communication of the cylinders with a source of fluid pressure, an element extending longitudinally within the cylinders having ducts open at its opposite ends in and proximate to the closed ends of the cylinders respectively, said ducts cooperating intermediate the ends of said element with the means of communication of the cylinders with the source of fluid pressure, pistons reciprocating in said cylinders respectively having the opposite end portions of said element extending through them respectively, and means for connecting the two pistons for movement together in both directions of their reciprocation.

7. In a construction for the purpose indicated in combination with two piston cylinders arranged end to end and closed at their remote ends, a piston member comprising two piston heads arranged for reciprocating in said cylinders respectively; a duct-containing member supported within the cylinder between the paths of reciprocation of the respective pistons, said member having tubes extending longitudinally of the cylinder and through the piston heads respectively, said tubes opening beyond the respective piston heads proximate the closed ends of the cylinder, said duct member having connection intermediate the proximate ends of said tubes affording to said tubes communication with a source of fluid pressure for operating the piston.

8. In the construction defined in claim 7, the piston cylinders having free atmospheric communication at their ends proximate opposite sides of the duct-containing member, and the duct-containing member having an opening constituting free air communication between the air spaces at opposite sides of said duct-containing member and between the same and the piston heads respectively, means connecting the two piston heads to form a unitarily operating piston comprising a rigid member rigidly joined at its opposite ends to the two piston heads respectively, and extending through said opening in the duct-containing member.

In testimony whereof I have hereunto set my hand at Chicago, Illinois, this 14th day of November, 1927.

WILLARD H. FARR.